United States Patent
Dain et al.

(10) Patent No.: US 10,169,019 B2
(45) Date of Patent: Jan. 1, 2019

(54) CALCULATING A DEPLOYMENT RISK FOR A SOFTWARE DEFINED STORAGE SOLUTION

(71) Applicant: International Business Machines Corporation, Armonk, NY (US)

(72) Inventors: Joseph W. Dain, Vail, AZ (US); Stefan Lehmann, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 1 day.

(21) Appl. No.: 15/359,161

(22) Filed: Nov. 22, 2016

(65) Prior Publication Data

US 2018/0143815 A1    May 24, 2018

(51) Int. Cl.
*G06F 8/60*        (2018.01)

(52) U.S. Cl.
CPC ..................... *G06F 8/60* (2013.01)

(58) Field of Classification Search
CPC ....................................................... G06F 8/60
USPC ........................................................ 717/168
See application file for complete search history.

(56) References Cited

U.S. PATENT DOCUMENTS

| | | | |
|---|---|---|---|
| 7,167,914 B2 | 1/2007 | Cohen et al. | |
| 7,904,753 B2 | 3/2011 | Athey et al. | |
| 8,683,424 B2 * | 3/2014 | Colombo | G06F 8/10 713/1 |
| 8,850,393 B2 | 9/2014 | Castro et al. | |
| 8,924,521 B2 | 12/2014 | Acuna et al. | |
| 8,978,015 B2 | 3/2015 | Pechanec et al. | |
| 9,037,911 B2 | 5/2015 | Rentschler et al. | |
| 9,270,754 B2 * | 2/2016 | Iyengar | H04L 67/1097 |
| 9,552,259 B1 | 1/2017 | Chopra et al. | |
| 9,678,731 B2 * | 6/2017 | Hassine | G06F 8/60 |
| 2005/0198631 A1 | 9/2005 | Bisher et al. | |
| 2011/0078510 A1 | 3/2011 | Beveridge et al. | |
| 2014/0282031 A1 | 9/2014 | Hinterbichler et al. | |
| 2015/0071123 A1 | 3/2015 | Sabaa | |
| 2015/0378702 A1 * | 12/2015 | Govindaraju | G06F 8/61 717/177 |
| 2016/0062746 A1 * | 3/2016 | Chiosi | G06F 8/35 717/104 |
| 2016/0110183 A1 | 4/2016 | Fu et al. | |
| 2016/0269317 A1 | 9/2016 | Barzik et al. | |
| 2017/0131899 A1 | 5/2017 | Billi et al. | |
| 2017/0251058 A1 | 8/2017 | Zachariassen et al. | |

(Continued)

FOREIGN PATENT DOCUMENTS

WO        2014/147607 A1        9/2014

OTHER PUBLICATIONS

Mark Peters, Monya Keane; "Key Reasons to Use Software-defined Storage—and How to Get Started"; IBM Whitepaper, IBM.com website; Feb. 2015.*

(Continued)

*Primary Examiner* — Qing Chen
*Assistant Examiner* — Clint Thatcher
(74) *Attorney, Agent, or Firm* — Kunzler, PC

(57) ABSTRACT

For calculating a deployment risk is disclosed, a processor generates a Software Defined Storage (SDS) solution for an SDS deployment. The processor further calculates a deployment risk for the SDS solution using a trade-off analytics function. In response to the deployment risk not exceeding a risk threshold, the processor deploys the SDS solution.

15 Claims, 15 Drawing Sheets

(56) References Cited

U.S. PATENT DOCUMENTS

| | | |
|---|---|---|
| 2018/0054454 A1 | 2/2018 | Astigarraga et al. |
| 2018/0074724 A1 | 3/2018 | Tremblay et al. |
| 2018/0143895 A1 | 5/2018 | Dain et al. |
| 2018/0143898 A1 | 5/2018 | Dain et al. |

OTHER PUBLICATIONS

Ateret Anaby Tavor; "IBM Watson Tradeoff Analytics—General Availability"; IBM.com website [full URL in reference]; May 28, 2015.*

M. Chu et al., "Distributed In Vivo Testing of Software Applications", Department of Computer Science, Columbia University, New York NY 10027, 2008. 4 pages.

H. Dai et al., "Configuration Fuzzing for Software Vulnerablility Detection", 2010 International Conference on Availability, Reliability and Security, 2010, 6 pages.

M. Diep et al., "Profiling Deployed Software: Strategic Probe Placement", DigitalCommons@UniversityofNebraska—Lincoln, CSE Technical Reports, Jan. 1, 2005, 25 pages.

A. Duarte et al., "Multi-Environment Software Testing on the Grid", AMC Digital Library, Proceedings of the 2006 workshop on Parallel and distributed systems, 9 pages.

A. Orso, "Monitoring, Analysis, and Testing of Deployed Software", AMC Digital Library, Proceedings of the FSE/SDP workshop on Future of software engineering research, Nov. 2010, 5 pages.

M. Stehr, "Fractionated Software for Networked Cyber-Physical Systems: Research Directions and Long-Term Vision", SRI International, Nov. 2011, 34 pages.

R. Sayyad et al., "Failure Analysis and Reliability Study of NAND Flash-Based Solid State Drives." Indonesian Journal of Electrical Engineering and Computer Science 2.2 (2016): 315-327.

T. Savor et al., "Continuous deployment at Facebook and OANDA." Proceedings of the 38th International Conference on Software Engineering Companion. ACM, 2016, 10 pages.

"List of Patents or Patent Applications Treated as Related" AppendixP, Aug. 29, 2018, p. 1.

U.S. Appl. No. 15/359,133, Office Action Summary, dated Jul. 5, 2018, pp. 1-20.

U.S. Appl. No. 15/359,322, Office Action Summary, dated Jul. 19, 2018, pp. 1-21.

* cited by examiner

Filter Threshold
209

Trade-off Analytics Function
211

| SDS Solution Identifier |
| 201 |
| Component Identifier |
| 210 |
| Raw Failures |
| 308 |
| Hard Failures |
| 310 |
| Soft Failures |
| 315 |

350

| Hard Failure Threshold |
| 355 |
| Soft Failure Threshold |
| 360 |
| Minor Version Threshold |
| 365 |
| Major Version Threshold |
| 370 |

CALCULATING A DEPLOYMENT RISK FOR A SOFTWARE DEFINED STORAGE SOLUTION

FIELD

The subject matter disclosed herein relates to software defined storage and more particularly relates to calculating a deployment risk software defined solution.

BACKGROUND

Software Defined Storage (SDS) solutions are often manually selected and deployed.

BRIEF SUMMARY

An apparatus for calculating a deployment risk is disclosed. The apparatus includes a processor and a memory storing code that is executed by the processor. The processor generates a Software Defined Storage (SDS) solution for an SDS deployment. The processor further calculates a deployment risk for the SDS solution using a trade-off analytics function. In response to the deployment risk not exceeding a risk threshold, the processor deploys the SDS solution. A method and computer program product also perform the functions of the apparatus.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 2F is a schematic block diagram illustrating one embodiment of computational elements;

DETAILED DESCRIPTION

Figure 1:
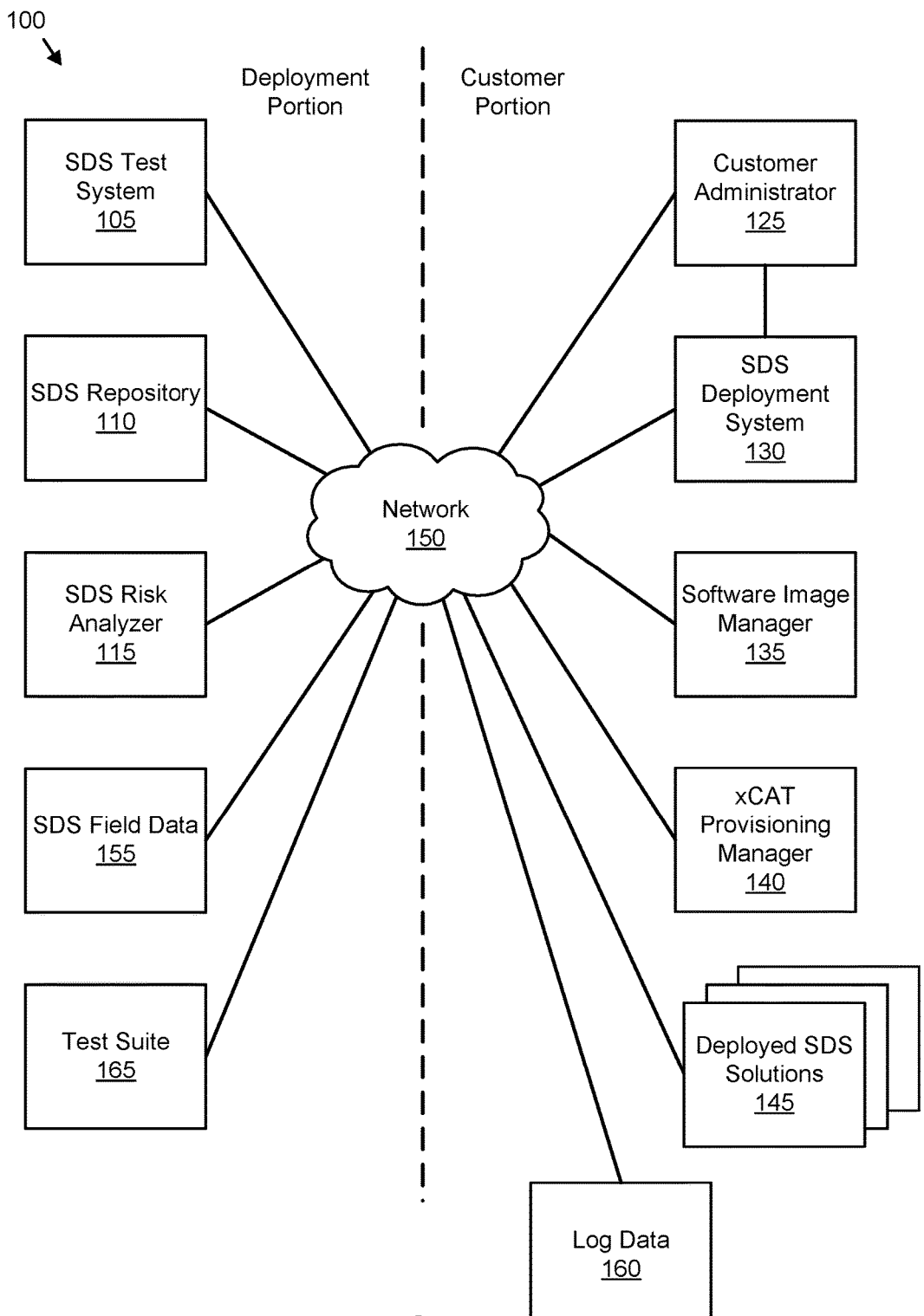
FIG. 1 is a schematic block diagram illustrating one embodiment of a Software Defined Storage (SDS) deployment system.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program instructions may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

The computer program product may be deployed by manually loading directly in the client, server and proxy computers via loading a computer readable storage medium such as a CD, DVD, etc., the computer program product may be automatically or semi-automatically deployed into a computer system by sending the computer program product to a central server or a group of central servers. The computer program product is then downloaded into the client computers that will execute the computer program product. Alternatively, the computer program product is sent directly to the client system via e-mail. The computer program product is then either detached to a directory or loaded into a directory by a button on the e-mail that executes a program that detaches the computer program product into a directory. Another alternative is to send the computer program product directly to a directory on the client computer hard drive. When there are proxy servers, the process will, select the proxy server code, determine on which computers to place the proxy servers' code, transmit the proxy server code, then install the proxy server code on the proxy computer. The computer program product will be transmitted to the proxy server and then it will be stored on the proxy server.

The computer program product, in one embodiment, may be shared, simultaneously serving multiple customers in a flexible, automated fashion. The computer program product may be standardized, requiring little customization and scalable, providing capacity on demand in a pay-as-you-go model.

The computer program product may be stored on a shared file system accessible from one or more servers. The computer program product may be executed via transactions that contain data and server processing requests that use Central Processor Unit (CPU) units on the accessed server. CPU units may be units of time such as minutes, seconds, hours on the central processor of the server. Additionally, the accessed server may make requests of other servers that require CPU units. CPU units are an example that represents but one measurement of use. Other measurements of use include but are not limited to network bandwidth, memory usage, storage usage, packet transfers, complete transactions etc.

When multiple customers use the same computer program product via shared execution, transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise, when other measurements of use such as network bandwidth, memory usage, storage usage, etc. approach a capacity so as to affect performance, additional network bandwidth, memory usage, storage etc. are added to share the workload.

The measurements of use used for each service and customer are sent to a collecting server that sums the measurements of use for each customer for each service that was processed anywhere in the network of servers that provide the shared execution of the computer program product. The summed measurements of use units are periodically multiplied by unit costs and the resulting total computer program product service costs are alternatively sent to the customer and or indicated on a web site accessed by the customer which then remits payment to the service provider.

In one embodiment, the service provider requests payment directly from a customer account at a banking or financial institution. In another embodiment, if the service provider is also a customer of the customer that uses the computer program product, the payment owed to the service provider is reconciled to the payment owed by the service provider to minimize the transfer of payments.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

The description of elements in each figure may refer to elements of proceeding figures. Like numbers refer to like elements in all figures, including alternate embodiments of like elements.

FIG. 1 is a schematic block diagram illustrating one embodiment of a Software Defined Storage (SDS) deployment system 100. The system 100 may deploy SDS solutions to customers. In the depicted embodiment, the system 100 is organized into a deployment portion and the customer portion. The deployment portion may deploy an SDS solution to the customer portion. The system 100 includes an SDS test system 105, a repository 110, an SDS risk analyzer 115, SDS field data 155, a test suite 165, a customer administrator 125, an SDS deployment system 130, a software image manager 135, an xCAT provisioning manager 140, one or more deployed SDS solutions 145, log data 160, and a network 150.

An SDS solution may provide flexible, highly configurable data storage for the customer. Unfortunately, the flexibility and configurability of the SDS solution may result in the deployment of SDS solutions that are prone to operational problems and failures. The embodiments described herein calculate a deployment risk for an SDS solution using a trade-off analytics function and in response to the deployment risk not exceeding a risk threshold, deploying the SDS solution as will be described hereafter.

The system 100 may deploy SDS solutions from the deployment portion over the network 150 to the customer portion. The network 150 may comprise the Internet, a wide-area network, a local area network, a Wi-Fi network, a mobile telephone network, and combinations thereof. The software image manager 135 may receive an SDS solution. The SDS deployment system 130 may deploy the SDS solution as directed by the customer administrator 125. Hardware and software elements of the SDS solution may be provided by the xCAT provisioning manager 140. The one or more deployed SDS solutions 145 may provide data storage for the customer. Notifications, error messages, and the like relating to the operation of the deployed SDS solutions 145 may be stored in the log data 160.

The SDS test system 105 may validate SDS solutions. In one embodiment, the SDS test system 105 employs the test suite 165 to validate SDS solutions. Validated SDS solutions may be stored in the SDS repository 110.

The SDS risk analyzer 115 may evaluate the deployment risks of deploying an SDS solution. In one embodiment, the SDS risk analyzer 115 evaluates the deployment risks of deploying an SDS solution that has not been validated by the SDS test system 105 using the test suite 165. Based on the evaluation of the risks, and un-validated SDS solution may be deployed.

The log data 160 and other information from the operation of the deployed SDS solutions 145 may be communicated to the SDS field data 155. The SDS field data 155 may be employed by the SDS risk analyzer 115 to evaluate the risk of deploying an SDS solution.

Figure 2A:
FIG. 2A is a schematic block diagram illustrating one embodiment of an SDS solution.

FIG. 2A is a schematic block diagram illustrating one embodiment of an SDS solution 200. The SDS solution 200 maybe organized as a data structure in a memory. In the depicted embodiment, the SDS solution 200 includes an SDS solution identifier 201 and a plurality of SDS components 205. The SDS solution identifier 201 may uniquely identify an SDS solution 200. The SDS solution identifier 201 may be an index and/or an alphanumeric string. An SDS component 205 may be an operating system, a hardware device, a driver, a software application, or combinations thereof. The SDS component 205 is described in more detail in FIG. 5B.

Figure 2B:
FIG. 2B is a schematic block diagram illustrating one embodiment of an SDS component.

FIG. 2B is a schematic block diagram illustrating one embodiment of the SDS component 205. The SDS component 205 may be organized as a data structure in a memory. In the depicted embodiment, the SDS component 205 includes a component identifier 210, a hardware identifier 215, software prerequisites 220, an operating system identifier 225, an operating system version 230, a driver identifier 233, and a driver version 235.

The component identifier 210 may uniquely identify the SDS component 205. The component identifier 210 may be an index and/or an alphanumeric string. The hardware identifier 215 may identify one or more hardware devices. The hardware devices may be integral to the SDS component 205. Alternatively, the hardware devices may be prerequisites required by the SDS component 205.

The software prerequisites 220 may identify one or more software instances that are required by the SDS component 205. In one embodiment, the software prerequisites 220 identify one or more combinations of software instances that could each be employed by the SDS component 205.

The operating system identifier 225 identifies an operating system that is required by the SDS component 205. The operating system version 230 identifies one or more required versions of the operating system.

The driver identifier 233 identifies a software and/or firmware driver for the SDS component 205. The driver version 235 identifies one or more required versions of the driver.

The hardware devices, software instances, operating systems, and device drivers of the SDS component 205 may be referred to generically as elements. Thus, the SDS component 205 comprises a plurality of elements. One or more of the hardware identifier 215, software prerequisites 220, operating system identifier 225, operating system version 230, driver identifier 233, and driver version identifier 235 may have a NULL value that indicates that the element is not used and/or not required.

Figure 2C:
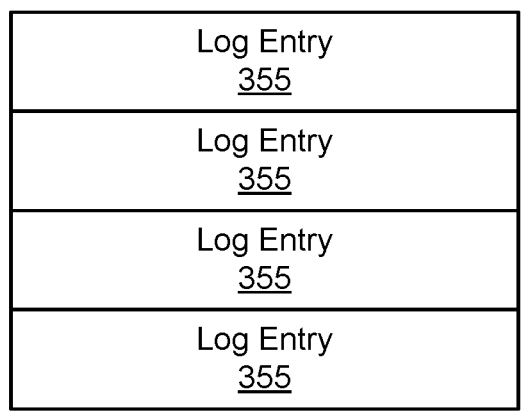
FIG. 2C is a schematic block diagram illustrating one embodiment of log data.

FIG. 2C is a schematic block diagram illustrating one embodiment of the log data 160. The log data 160 may be organized as a data structure in a memory. In the depicted embodiment, the log data 160 includes one or more log entries 355. Each log entry 355 may comprise one or more of a status report, a notification, and an error message. The log entries 355 may be recorded for deployed SDS solutions 145. In one embodiment, each log entry 355 includes an SDS solution identifier 201. Alternatively, the log data 160 may include the SDS solution identifier 201. In a certain embodiment, the log data 160 includes information from which the SDS solution identifier 201 may be calculated.

Figure 2D:
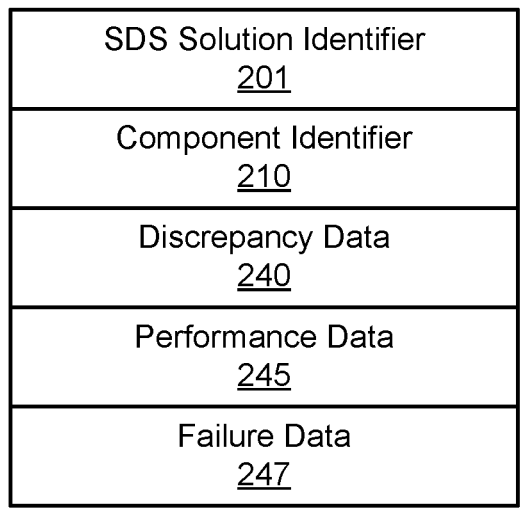
FIG. 2D is a schematic block diagram illustrating one embodiment of SDS field data.

FIG. 2D is a schematic block diagram illustrating one embodiment of the SDS field data 155. The SDS field data 155 may be organized as a data structure in a memory. In the depicted embodiment, an SDS field data instance 155 is shown that includes the SDS solution identifier 201, the component identifier 210, discrepancy data 240, performance data 245, and failure data 247. The SDS field data 155 may include a plurality of SDS field data instances 155.

The discrepancy data 240 may record discrepancies, errors, problem reports, failures, and the like associated with the SDS solution 200 identified by the SDS solution identifier 201 and/or the SDS component 205 identified by the component identifier 210. In one embodiment, the discrepancy data 240 is calculated as a function of the failure data 247 such as hard failures and soft failures in the failure data 247 and a hard failure threshold and the soft failure threshold. In a certain embodiment, hard failures are failures that exceed the hard failure threshold. In addition, soft failures may be failures that exceed the soft failure threshold but do not exceed the hard failure threshold.

The performance data 240 may record one or more performance metrics associated with the SDS solution 200 identified by the SDS solution identifier 201 and/or the SDS component 205 identified by the component identifier 210. The failure data 247 is described in more detail in FIG. 3B.

Figure 2E:
FIG. 2E is a schematic block diagram illustrating one embodiment of SDS parameters.

FIG. 2E is a schematic block diagram illustrating one embodiment of SDS parameters 175. The SDS parameters 175 may be organized as a data structure in a memory. In the depicted embodiment, the SDS parameters 175 included an SDS solution identifier 201, SDS components 205, SDS elements 207, software prerequisites 220, and advance features 217. However, the SDS parameters 175 may include no SDS components 205 and/or no SDS elements 207.

In one embodiment, allowable discrepancies 213 are associated with each of the SDS components 205, SDS elements 207, software prerequisites 220, and advanced features 217. The allowable discrepancies 213 may specify a hard failure threshold, a soft failure threshold, a minor version threshold, and/or a major version threshold. The hard failure threshold, soft failure threshold, minor version threshold, and major version threshold are described in more detail in FIG. 3C.

The allowable discrepancies 213 for the advanced features 217 may specify a risk weight. The risk weights may include low, medium, and high risk weights.

The SDS solution identifier 201 may identify a model and/or desired SDS solution 200. Each SDS element 207 may identify a portion of an SDS component 205. For example, an SDS element 207 may identify a hard disk drive model with a hardware identifier 215 without identifying software prerequisites 220, an operating system identifier 225, or a driver identifier 230. The software prerequisites 220 may specify one or more prerequisite conditions for the SDS solution 200. The advanced features 217 may specify one or more SDS components 205 with limited deployment and/or limited deployment history.

The SDS parameters 175 may be specified by the customer administrator 125, the SDS risk analyzer 115, and/or a computer to provide a preliminary description of the model SDS solution 200 and/or the desired SDS solution 200.

FIG. 2F is a schematic block diagram illustrating one embodiment of computational elements. The computational elements may comprise encoded algorithms, Application Program Interfaces (API), or the like. The computational elements may include a filter threshold 209 and a trade-off analytics function 211. The filter threshold 209 may be created for the SDS parameters 175 and used to identify a validated SDS solution 200 as will be described hereafter.

In one embodiment, the trade-off analytics filter 211 may be calculate a deployment risk for the SDS parameters 175 and/or an SDS solution 200. The trade-off analytics function 211 may be calculated as a function of SDS components 205, discrepancy data 240, and performance data 245. In a certain embodiment, the trade-off analytics function 211 is further calculated as a function of failure data 247. In one embodiment, the trade-off analytics function 211 is a tradeoff analytics API such as the WATSON® trade-off analytics API. The trade-off analytics function 211 may be trained using training data.

Figure 3A:
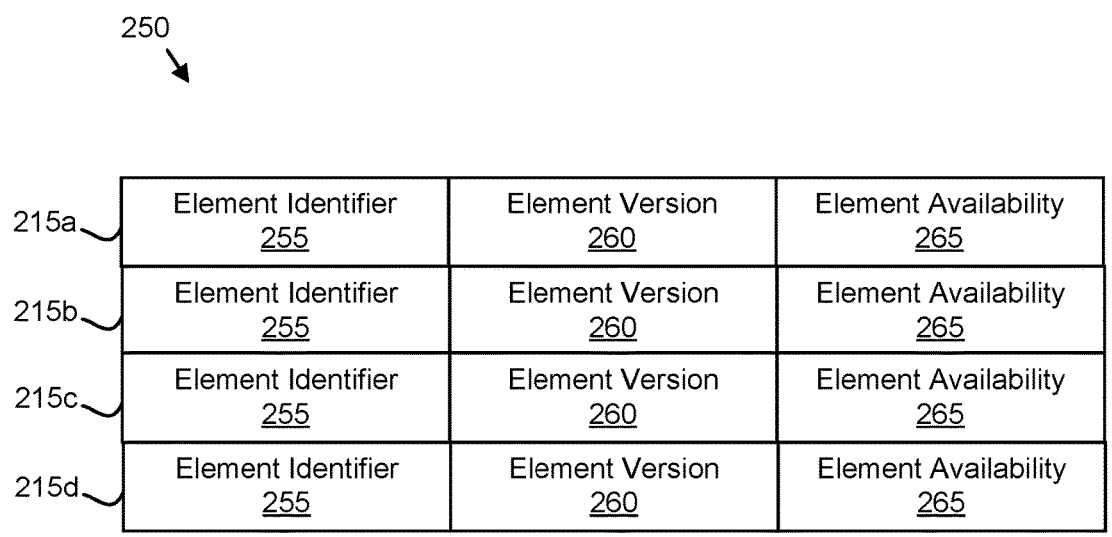
FIG. 3A is a schematic block diagram illustrating one embodiment of an availability matrix.

FIG. 3A is a schematic block diagram illustrating one embodiment of an availability matrix 250. The availability matrix 250 may record the availability of SDS elements 207 of SDS components 205. The SDS repository 110 may store the availability matrix 250. The availability matrix 250 may be organized as a data structure in a memory. In the depicted embodiment, the availability matrix 250 includes a plurality of availability matrix entries 215. Each availability matrix entry 215 includes an element identifier 255, an element version 260, and an element availability 265. The availability matrix 250 may store an entry 215 for each SDS element 207 of each SDS component 205.

The element identifier 255 may identify an SDS element 207 that is used in one or more SDS components 205. The element identifier 255 may be a software identifier, hardware model number, or combinations thereof. The element version 260 may specify a unique version of the SDS element 207. The element availability 265 may specify whether the SDS element 207 is available. For example, if a hard disk drive identified by the element identifier 255 with a model number specified by the element identifier 255 cannot be procured and/or cannot be deployed, the element availability 265 may be set to "unavailable." However, if the hard disk drive can be procured and/or can be deployed, the element availability 265 may be set to "available."

Figure 3B:
FIG. 3B is a schematic block diagram illustrating one embodiment of failure data.

FIG. 3B is a schematic block diagram illustrating one embodiment of the failure data 247. The failure data 247 may be organized as a data structure in a memory. In one embodiment, the failure data 247 is stored with the SDS field data 155. In the depicted embodiment, the failure data 247 includes the SDS solution identifier 201, the component identifier 210, raw failures 308, hard failures 310, and soft failures 315.

The raw failures 308 may comprise uncategorized failures from the log data 160. In one embodiment, the hard failures 310 record a number of raw failures 308 that exceed the hard failure threshold for the SDS solution 200 identified by the SDS solution identifier 201 and/or the SDS component 205 identified by the component identifier 210. The soft failures 315 may record a number of raw failures 308 that exceed the soft failure threshold for the SDS solution 200 identified by the SDS solution identifier 201 and/or the SDS component 205 identified by the component identifier 210.

Figure 3C:
FIG. 3C is a schematic block diagram illustrating one embodiment of threshold data.

FIG. 3C is a schematic block diagram illustrating one embodiment of threshold data 350. The threshold data 350 may be organized as a data structure in a memory. In one embodiment, the threshold data 350 is stored with the SDS field data 155. In the depicted embodiment, the threshold data 350 includes the hard failure threshold 355, the soft failure threshold 360, the minor version threshold 365, and the major version threshold 370. The hard failure threshold 355, the soft failure threshold 360, the minor version threshold 365, and the major version threshold 370 may be determined from the allowable discrepancies 213.

The hard failure threshold 355 may specify one or more of a type of failure and/or a quantity of failures. When the hard failure threshold 355 is exceeded, a hard failure 310 may be identified. The soft failure threshold 360 may specify one or more of a type of failure and a quantity of failures. When the soft failure threshold 360 is exceeded, a soft failure 315 may be identified. In one embodiment, if both the hard failure threshold 355 and the soft failure threshold 360 are exceeded, a hard failure 310 is identified.

The minor version threshold 365 may specify a maximum allowable difference between versions of SDS components 205 and/or SDS elements 207. Minor version differences that exceed the minor version threshold 365 may not be allowable. The major version threshold 370 may specify a maximum allowable difference between major versions of SDS components 205 and/or SDS elements 207. Major version differences that exceed the major version threshold 270 may not be allowable.

Figure 4A:
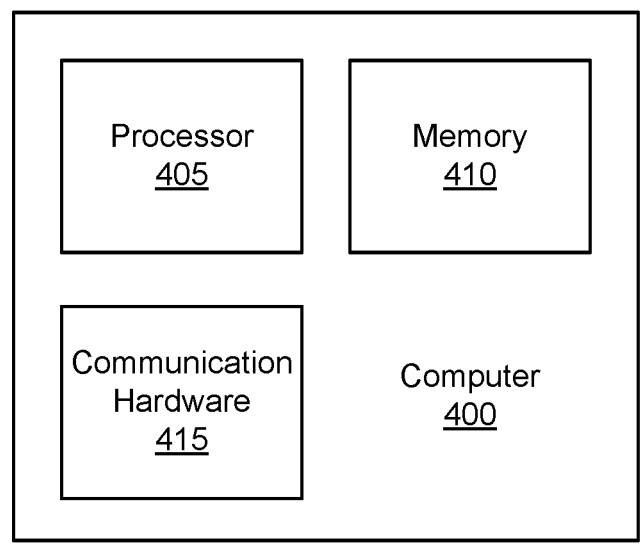
FIG. 4A is a schematic block diagram illustrating one embodiment of a computer.

FIG. 4A is a schematic block diagram illustrating one embodiment of a computer 400. The computer 400 may be embodied in one or more of the SDS test system 105, the SDS repository 110, the SDS risk analyzer 115, the customer administrator 125, the SDS deployment system 130, the software image manager 135, and the xCAT provisioning manager 140. In the depicted embodiment, the computer 400 includes a processor 405, a memory 410, and communication hardware 415. The memory 410 may include a semiconductor storage device, hard disk drive, an optical storage device, a micromechanical storage device, or combinations thereof. The memory 410 may store code. The processor 405 may execute the code. The communication hardware 415 may communicate with other devices.

Figure 4B:
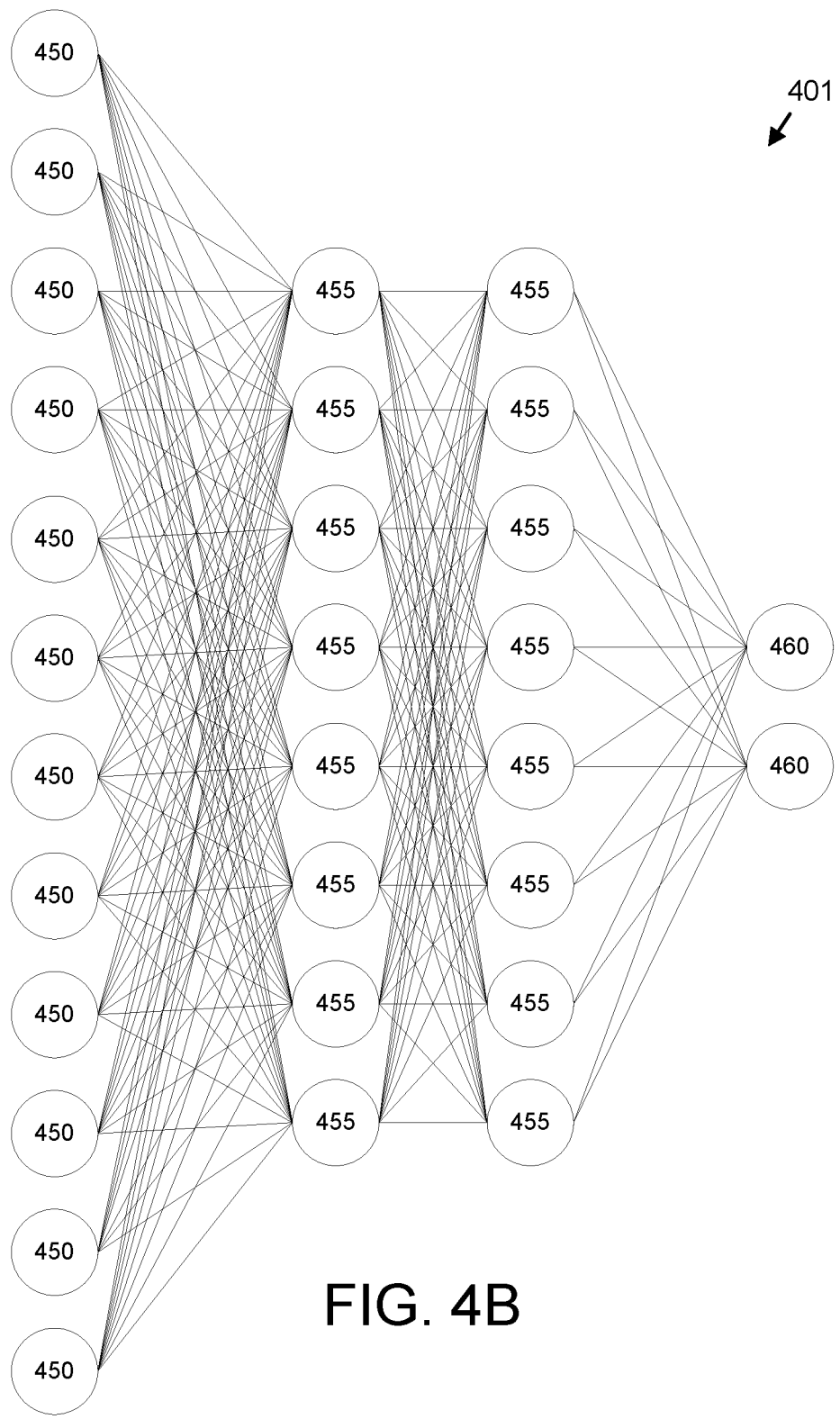
FIG. 4B is a schematic block diagram illustrating one embodiment of a neural network.

FIG. 4B is a schematic block diagram illustrating one embodiment of a neural network 401. The trade-off analytics function 211 may embody the neural network 401. The neural network 401 includes a plurality of input nodes 450, a plurality of hidden nodes 455, and a plurality of output nodes 460. The output nodes 460 may represent one or more results and/or conclusions. In a certain embodiment, the output nodes 460 define an SDS solution 200. The input data may be encoded and presented to the input nodes 450. In one embodiment, the input data may be SDS field data 155. The hidden nodes 455 and the output nodes 460 may be trained using training data. The training data may comprise the SDS field data and corresponding component identifiers 210 and element identifiers 255. After the neural network 401 is trained, the encoded SDS field data 155 may be presented to the input nodes 450 to generate recommend SDS solutions 200 at the output nodes 460. In an alternate embodiment, one or more of a decision tree, a sum of weighted products, and the like may comprise the trade-off analytics function 211.

Figure 5A:
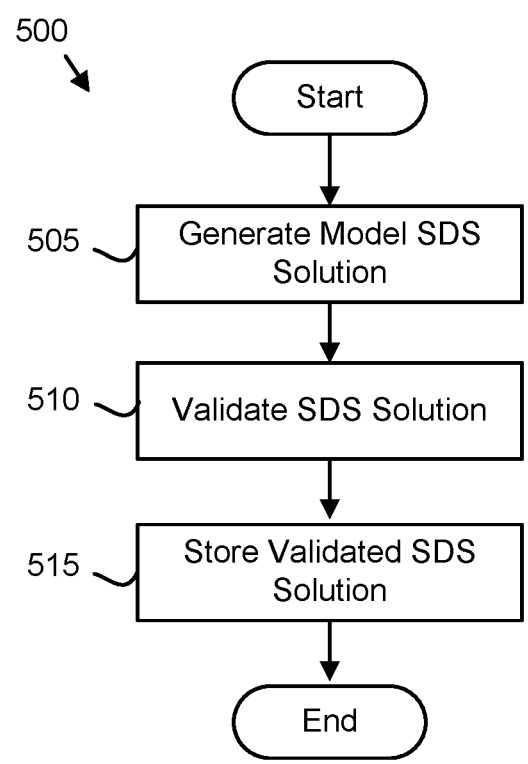
FIG. 5A is a schematic flow chart diagram illustrating one embodiment of a validation method.

FIG. 5A is a schematic flow chart diagram illustrating one embodiment of a validation method 500. The method 500 may validate and store an SDS solution 200. The method 500 may be performed by the computer 400 and/or by the processor 405 of the computer 400. In addition, the method 500 may be performed by a computer readable storage medium such as the memory 410 storing code that is executable by the processor 405.

The method 500 starts, and in one embodiment, the processor 405 generates 505 a model SDS solution 200. In one embodiment, the model SDS solution 200 is generated 505 based on one or more desired SDS parameters 175 for a desired SDS solution 200 supplied by the customer administrator 125. In addition, the SDS risk analyzer 115 analyze the one or more desired SDS parameters 175 to generate 505 the model SDS solution 200. In one embodiment, the SDS risk analyzer 115 employs the neural network 401 to analyze the one or more desired SDS parameters 175 and generate the model SDS Solution 200.

The processor 405 may validate 510 the model SDS solution 200 using the test suite 165. In one embodiment, the SDS test system 105 autonomously performs the test suite 165 on the model SDS solution 200. If the model SDS solution 200 fails the test suite 165, the model SDS solution 200 may be iteratively modified until the model SDS solution 200 passes the test suite 165.

In one embodiment, the processor 405 may validate 510 the model SDS solution 200 using the availability matrix 250. The processor 405 may determine that each element of each SDS component 205 of the model SDS solution 200 is available for deployment. In a certain embodiment, the model SDS solution 200 must be both validated by the test suite 165 and the availability matrix 250 to be considered fully validated.

In response to validating the model SDS solution 200, the processor 405 may store the validated SDS solution 200 in the SDS repository 110 and the method 500 ends.

Figure 5B:
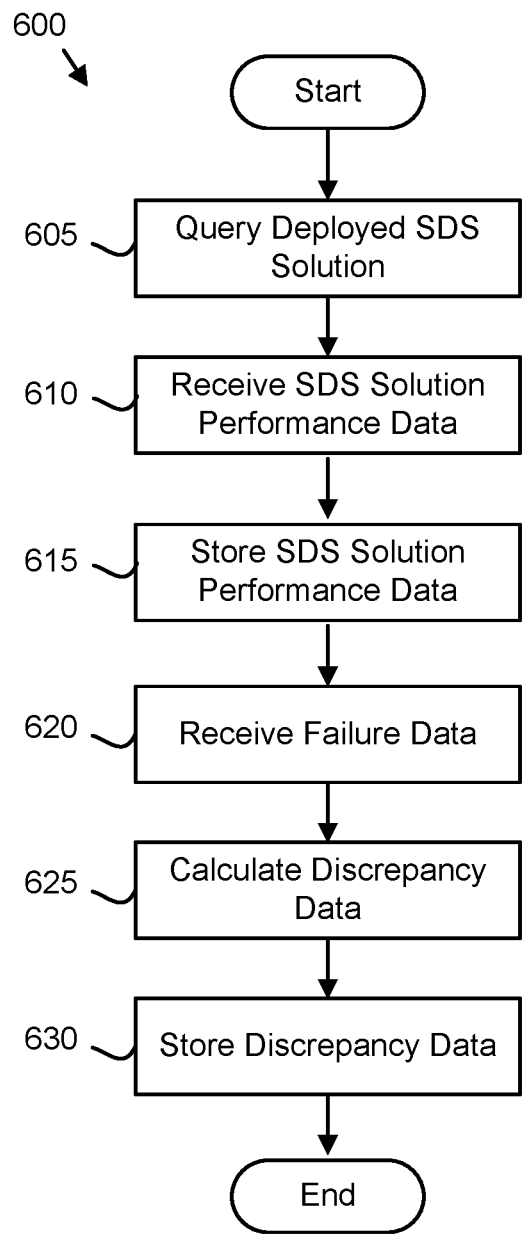
FIG. 5B is a schematic flow chart diagram illustrating one embodiment of discrepancy data method.

FIG. 5B is a schematic flow chart diagram illustrating one embodiment of discrepancy data method 600. The method 600 may store performance data 245 from a deployed SDS solution 145 and calculate and store discrepancy data 240 from the deployed SDS solution 145. The method 600 may be performed by the computer 400 and/or by the processor 405 of the computer 400. In addition, the method 600 may be performed by a computer readable storage medium such as the memory 410 storing code that is executable by the processor 405.

The method 600 starts, and in one embodiment, the processor 405 queries 605 a deployed SDS solution 145 for performance data 245. The processor 405 may query 605 the deployed SDS solution 145 through the network 150. In one embodiment, a query request includes one or more authorization credentials. In a certain embodiment, the processor 405 also queries 605 the deployed SDS solution 145 for failure data 247. The failure data 247 may be embodied in the log data 160.

The processor 405 further receives 610 the performance data 245 from the deployed SDS solution 145. In a certain embodiment, the performance data 245 is included in the log data 160. The processor 405 may store 615 the performance data 245. In one embodiment, the performance data 245 is stored 615 in the SDS field data 155.

The processor 405 may receive 620 the failure data 247. The failure data 247 may be included in the log data 160. The processor 405 may further calculate 625 the discrepancy data 240 from the failure data 247. In one embodiment, the processor 405 generates a training data set from the log data 160 that includes outputs of an SDS solution identifier 201 and a component identifier 210 for previous failure data 247, hard failures 310 for the previous failure data 247, and soft failures 315 for the previous failure data 247. The processor 405 may further train the neural network 401 using the training data set. The processor 405 may calculate 625 the discrepancy data 240 from the failure data 247 of the log data 160 by encoding the log data 160 and introducing the encoded log data 160 to the neural network 401.

In an alternative embodiment, the processor 405 may identify a discrete error message within the failure data 247. The processor 405 may further identify the SDS solution identifier 201 and the component identifier 210 from the error message. In one embodiment, the processor 405 calculate 625 whether a failure of the error message exceeds the hard failure threshold 355. If the failure exceeds the hard failure threshold 355, the processor 405 may identify a hard failure 310. In one embodiment, the calculation 625 stops after identifying one hard failure 310. The processor 405 may further calculate 625 whether the failure of the error message exceeds the soft failure threshold 360. If the failure exceeds the soft failure threshold 360 and does not exceed the hard failure threshold 355, the processor 405 may identify a soft failure 315.

In one embodiment, the processor 405 employs a heuristic algorithm that analyzes the discrete error message and two to five preceding error messages to calculate 625 the hard failures 310 and the soft failures 315. The processor 405 may store 630 the discrepancy data 240 to the SDS field data 155 and the method 600 ends.

Figure 5C:
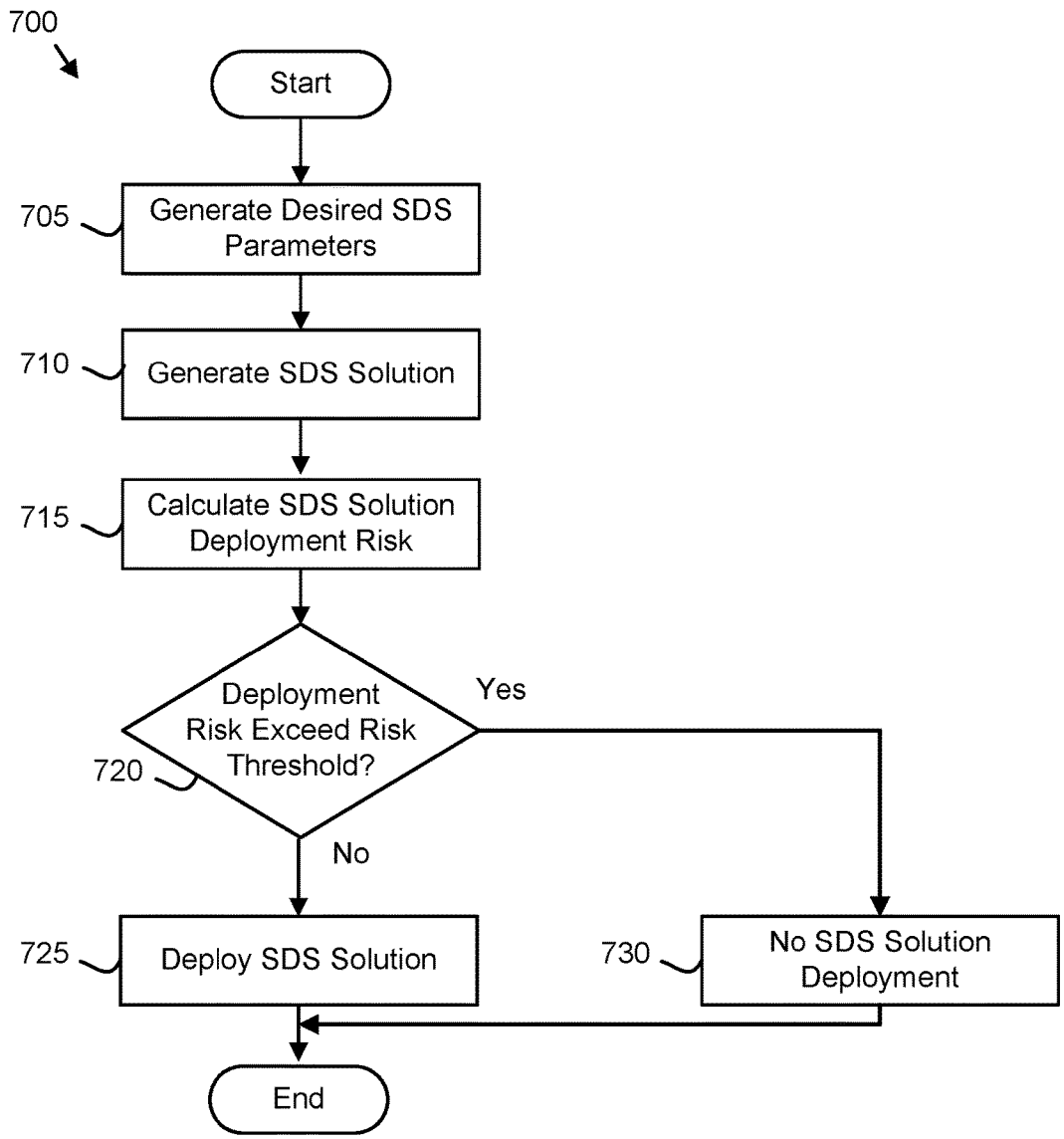
FIG. 5C is a schematic flow chart diagram illustrating one embodiment of an SDS solution deployment risk calculation method.

FIG. 5C is a schematic flow chart diagram illustrating one embodiment of an SDS solution deployment risk calculation method 700. The method 700 may calculate a deployment risk for an SDS solution 200. In addition, the method 700 may deploy the SDS solution 200. The method 700 may be performed by the computer 400 and/or by the processor 405 of the computer 400. In addition, the method 700 may be performed by a computer readable storage medium such as the memory 410 storing code that is executable by the processor 405. Portions of the method 700 may be performed by the neural network 401.

The method 700 starts, and in one embodiment, the processor 405 generates 705 one or more desired SDS parameters 175. The one or more desired SDS parameters 175 may be supplied by the customer administrator 125 for an SDS deployment 140. For example, the customer administrator 125 may select a series of options that define the desired SDS parameters 175. Alternatively, the one or more desired SDS parameters 175 may be generated 705 by a configuration algorithm. The configuration algorithm may generate 705 the desired SDS parameters 175 from one or more system requirements.

The processor 405 may generate 710 an SDS solution 200 for an SDS deployment. In one embodiment, the SDS solution 200 is generated 710 from the one or more desired SDS parameters 175 for an SDS solution 200. In addition, the SDS risk analyzer 115 may analyze the one or more desired SDS parameters 175 to generate 705 the SDS solution 200. In one embodiment, the SDS risk analyzer 115 employs the neural network 401 to analyze the one or more desired SDS parameters 175 and generate 705 the model SDS solution 200.

The processor 405 may calculate 715 a deployment risk for the SDS solution 200 using the trade-off analytics function 211. The trade-off analytics function 211 may calculate 715 the deployment risk as a function of the SDS components 205 for the SDS solution, the discrepancy data 240 for the SDS components 205, and performance data 245 for the SDS components 205. In a certain embodiment, the trade-off analytics function 211 is further calculated as a function of failure data 247. In one embodiment, the trade-off analytics function 211 is the WATSON® trade-off analytics API. Alternatively, the trade-off analytics function 211 may be the method of FIG. 5D.

The processor 405 may determine 720 whether the deployment risk exceeds a risk threshold. In one embodiment, the risk threshold is calculated such that a probability of a hard error is less than six sigma. If the deployment risk does not exceed the risk threshold, the processor 405 deploys 725 the SDS solution 200 and the method 700 ends. The SDS solution 200 may be deployed 720 by being copied to the software image manager 135 and installed as a deployed SDS solution 145 by the xCAT provisioning manager 140.

If the deployment risk exceeds the risk threshold, the processor 405 may not deploy 730 the SDS solution 200 and the method 700 ends.

Figure 5D:
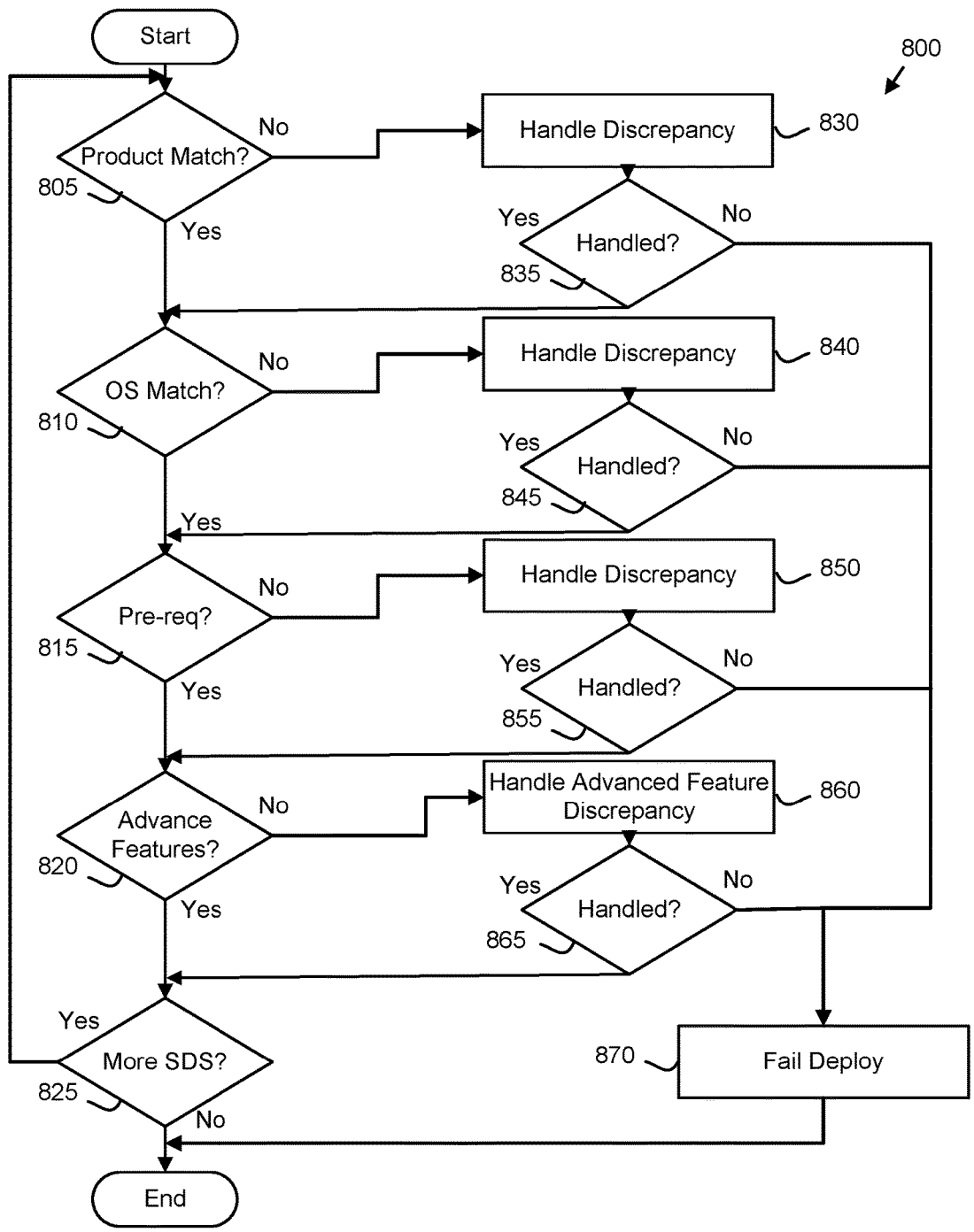
FIG. 5D is a schematic flowchart diagram illustrating one embodiment of a deployment risk calculation method.

FIG. 5D is a schematic flowchart diagram illustrating one embodiment of a deployment risk calculation method 800. The method 800 may calculate deployment risk for an SDS solution 200. The method 800 may perform step 720 of FIG.

5C. The method 800 may be performed by the computer 400 and/or by the processor 405 of the computer 400. In addition, the method 800 may be performed by a computer readable storage medium such as the memory 410 storing code that is executable by the processor 405.

The method 800 starts, and in one embodiment, the processor 405 determines 805 if there is a product match between the SDS solution 200 and the SDS parameters 175. The SDS parameters 175 may be embodied in a configuration file. There may be a product match if each of the SDS components 205 in the SDS parameters 175 such as a tape drive and/or multi-library support is included as an SDS component 205 in the SDS solution 200.

If there is no product match between the SDS solution 200 and the SDS parameters 175, the processor 405 handles 830 the discrepancy. In one embodiment, the discrepancy is handled 830 as described in FIG. 5E. The processor 405 may determine 835 if the discrepancy was handled. If the discrepancy was not handled, the products are mismatched and the processor 405 fails 870 to deploy the SDS solution 200 and the method 800 ends.

If there is a product match between the SDS solution 200 and the SDS parameters 175 or if the product match discrepancy is handled 835, the processor 405 determines 810 if there is an operating system match between the SDS solution 200 and the SDS parameters 175. The operating system may match if one or more of a version number, a configuration, and the like are equivalent.

Figure 5E:
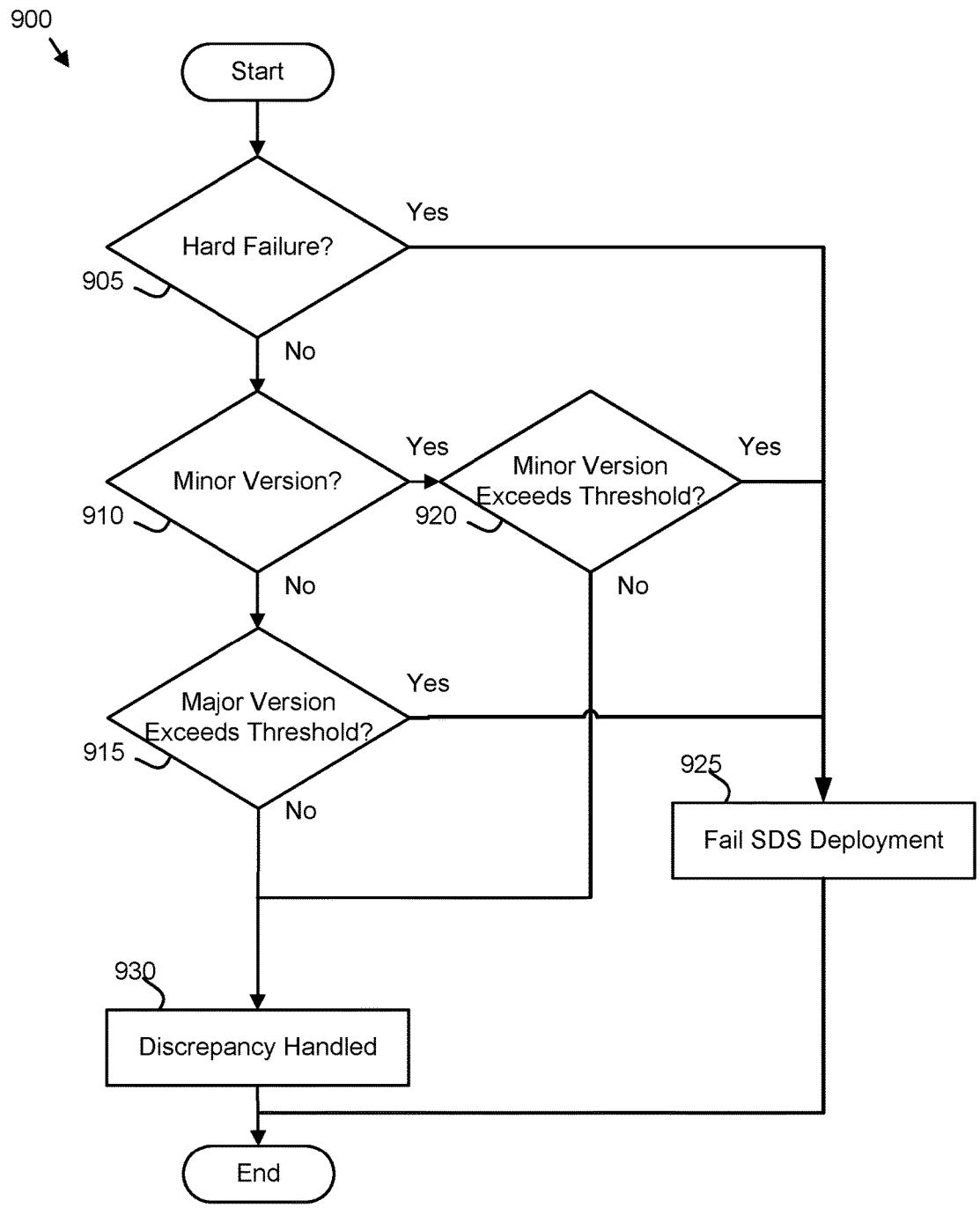
FIG. 5E is a schematic flowchart diagram illustrating one embodiment of a discrepancy handling method.

If there is no operating system match between the SDS solution 200 and the SDS parameters 175, the processor 405 handles 840 the discrepancy as described in FIG. 5E. The processor 405 may determine 845 if the discrepancy was handled. If the discrepancy was not handled, the operating system is mismatched and the processor 405 fails 870 to deploy the SDS solution 200 and the method 800 ends.

If there is an operating system match tween the SDS solution 200 and the SDS parameters 175 or if the operating system discrepancy is handled 845, the processor 405 determines 815 if the software prerequisites 220 for the SDS parameters 175 are satisfied in the SDS solution 200. If the software prerequisites 220 are not satisfied, the processor 405 may handle 850 the discrepancy as described in FIG. 5E. The processor 405 may determine 855 if the discrepancy was handled. If the discrepancy was not handled, the processor 405 fails 870 to deploy the SDS solution 200 and the method 800 ends.

If the software prerequisites 220 are satisfied or if the prerequisite discrepancy is handled 855, the processor 405 determines 820 if the advanced features 217 are satisfied. The determination 820 of whether the advanced features 217 are satisfied is described in FIG. 5F. If the advanced features 217 are not satisfied the processor 405 may handle 860 the discrepancy as described in FIG. 5F. The processor 405 may determine 865 if the discrepancy was handled. If the discrepancy was not handled, the processor 405 fails 870 to deploy the SDS solution 200 and the method 800 ends.

If the advanced features 217 are satisfied or if the advanced feature discrepancy is handled 865, the processor 405 determines if there are more SDS solutions 200 for which to handle discrepancies. If there are more SDS solutions 200, the method loops to step 805. If there are no more SDS solutions 200, the method 800 ends.

FIG. 5E is a schematic flowchart diagram illustrating one embodiment of a discrepancy handling method 900. The method 900 may handle discrepancies between the SDS solution 200 and the SDS parameters 175. In addition, the method 900 may perform steps 830, 840, and/or 850 of FIG. 5D. The method 900 may be performed by the computer 400 and/or by the processor 405 of the computer 400. In addition, the method 900 may be performed by a computer readable storage medium such as the memory 410 storing code that is executable by the processor 405.

The method 900 starts, and in one embodiment, the processor 405 determines 905 if hard failures 310 for the SDS solution 200 exceed the hard failure threshold 355. In one embodiment, the hard failure threshold 355 is zero hard failures. If the hard failures 310 exceed the hard failure threshold 355, the processor 405 may fail 925 the SDS deployment and the method 900 ends.

If the hard failures 310 do not exceed the hard failure threshold 355, the processor 405 determines 910 if there is a minor version difference between the SDS solution 200 and the SDS parameters 175. If there is a minor version difference, the processor 405 determines 920 if the minor version difference exceeds the minor version threshold 365. If the minor version difference exceeds the minor version threshold 365, the processor 405 may fail 925 the SDS deployment and the method 900 ends. If the minor version difference does not exceeds the minor version threshold 365, the discrepancy is handled 930 and the method 900 ends.

If there is no minor version difference, the processor 405 determines 915 if a major version difference between the SDS solution 200 and the SDS parameters 175 exceeds the major version threshold 370. If the major version difference exceeds the major version threshold 370, the processor 405 may fail 925 the SDS deployment and the method 900 ends. If the major version difference does not exceed the major version threshold 370, the discrepancy is handled 930 and the method 900 ends.

Figure 5F:
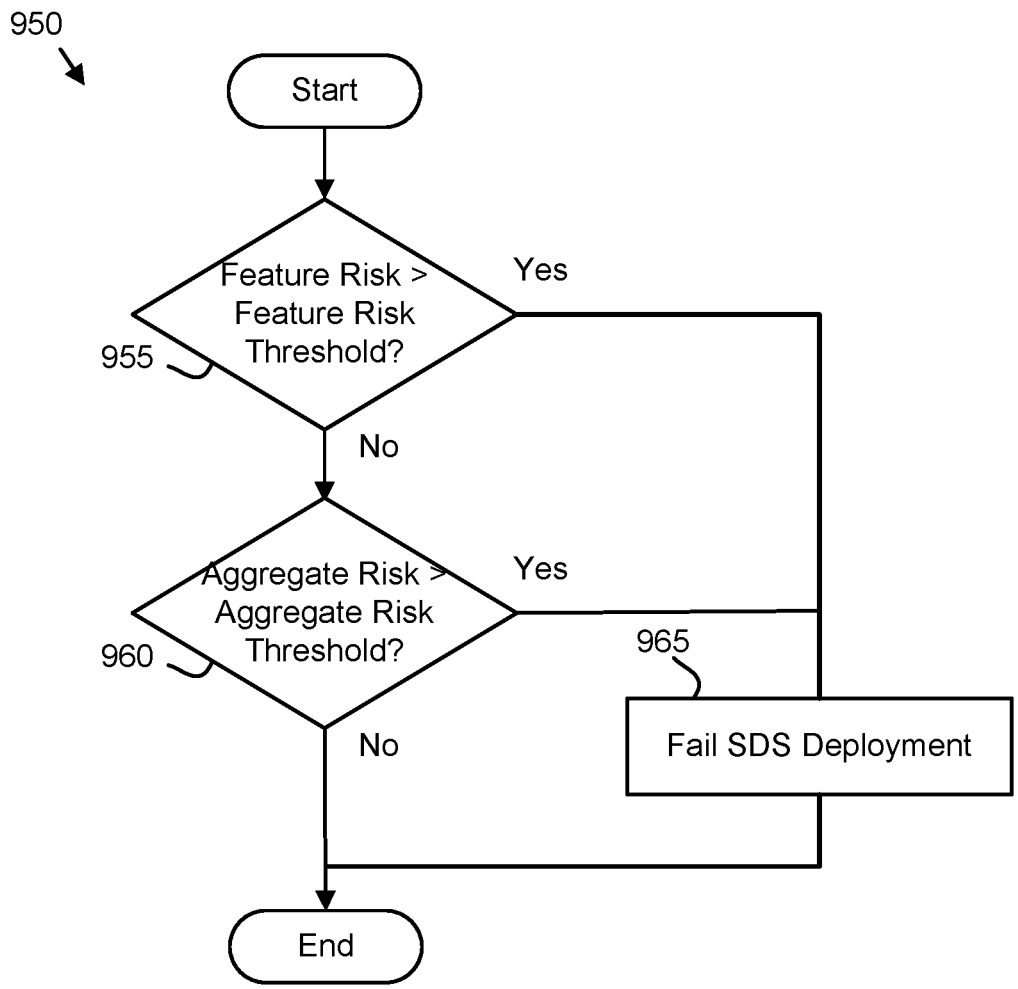
FIG. 5F is a schematic flowchart diagram illustrating one embodiment of an advanced feature risk threshold method.

FIG. 5F is a schematic flowchart diagram illustrating one embodiment of an advanced feature risk threshold method 950. The method 950 may determine if the advanced features 217 are satisfied and handle an advanced feature discrepancy. In one embodiment, the method 950 performs steps 820 and/or 860 of FIG. 5D. The method 950 may be performed by the computer 400 and/or by the processor 405 of the computer 400. In addition, the method 950 may be performed by a computer readable storage medium such as the memory 410 storing code that is executable by the processor 405.

The method 950 starts, and in one embodiment, the processor 405 determines 955 if a feature risk is greater than a feature risk threshold. The feature risk may be calculated from one or more of the hard failures 310 and the soft failures 315. The feature risk threshold may specify a maximum allowable number of hard failures 310 and a maximum allowable number of soft failures 315. If the feature risk exceeds the feature risk threshold, the processor 405 may fail 965 the deployment of the SDS solution 200 and the method 950 ends.

If the feature risk does not exceed the feature risk threshold, the processor 405 may determine 960 if an aggregate risk exceeds an aggregate risk threshold. The aggregate risk may be calculated as a function of the risk weights from the allowable discrepancies 213 for the advanced features 217. If the aggregate risk exceeds the aggregate risk threshold, the processor 405 may fail 965 the deployment of the SDS solution 200 and the method 950 ends. If the aggregate risk does not exceed the aggregate risk threshold, the method 950 ends and the SDS solution 200 may be deployed.

The embodiments generate an SDS solution 200 for an SDS deployment and calculate the deployment risk for the SDS solution 200 using a trade-off analytics function 211. In addition, the SDS solution 200 is only deployed if the deployment risk does not exceed the risk threshold. As a result, only low risk SDS solutions 200 are deployed.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
    a processor;
    a memory storing code executable by the processor to perform:
    querying a deployed data storage solution for performance data, wherein the data storage solution provides data storage using hardware elements, software elements, an operating system, and drivers for the software elements;
    receiving the performance data from the deployed data storage solution;
    storing the performance data;
    receiving failure data;
    calculating discrepancy data for the deployed data storage solution from the failure data;
    storing the discrepancy data;
    generating data storage solution that provides configurable data storage for data storage deployment, wherein the data storage solution is organized as a data structure comprising a plurality of data storage components, and each data storage component comprises a hardware identifier for the hardware elements, and software prerequisites for the software elements, the operating system identifier, and a driver identifier for software elements;
    calculating a deployment risk for the data storage solution using a trade-off analytics function performed by a neural network and based on the discrepancy data, the performance data, a product match, an operating system match, and a software prerequisites match between the data storage solution and data storage parameters, wherein the neural network is trained on data storage solution field data comprising discrepancy data, performance data, and failure data for deployed data storage solutions; and
    in response to the deployment risk not exceeding a risk threshold, deploying the data storage solution by providing the hardware and software elements.

2. The apparatus of claim 1, the processor further managing discrepancies of the data storage solution.

3. The apparatus of claim 2, wherein the discrepancies comprise one or more of a product mismatch, an operating system mismatch, a prerequisite being unsatisfied, and an advanced feature being unsatisfied.

4. The apparatus of claim 1, wherein the trade-off analytics function is a trade-off analytics Application Program Interface (API).

5. The apparatus of claim 1, wherein the data storage solution is generated from one or more desired data storage parameters for the data storage deployment.

6. The apparatus of claim 1, wherein the method further comprises:
    generating a model data storage solution;
    validating the model data storage solution using a test suite; and
    in response to validating the model data storage solution, storing the validated data storage solution in the data storage repository.

7. A method comprising:
    querying, by use of a processor, a deployed data storage solution for performance data, wherein the data storage solution provides data storage using hardware elements, software elements, an operating system, and drivers for the software elements;
    receiving the performance data from the deployed data storage solution;
    storing the performance data;
    receiving failure data;
    calculating discrepancy data for the deployed data storage solution from the failure data;
    storing the discrepancy data;
    generating data storage solution that provides configurable data storage for an data storage deployment, wherein the data storage solution is organized as a data structure comprising a plurality of data storage components, and each data storage component comprises a hardware identifier for the hardware elements, and software prerequisites for the software elements, the operating system identifier, and a driver identifier for software elements;
    calculating a deployment risk for the data storage solution using a trade-off analytics function performed by a neural network and based on the discrepancy data, the performance data, a product match, an operating system match, and a software prerequisites match between the data storage solution and data storage parameters, wherein the neural network is trained on data storage solution field data comprising discrepancy data, performance data, and failure data for deployed data storage solutions; and
    in response to the deployment risk not exceeding a risk threshold, deploying the data storage solution by providing the hardware and software elements.

8. The method of claim 7, the method further comprising managing discrepancies of the data storage solution.

9. The method of claim 8, wherein the discrepancies comprise one or more of a product mismatch, an operating system mismatch, a prerequisite being unsatisfied, and an advanced feature being unsatisfied.

10. The method of claim 7, wherein the trade-off analytics function is a trade-off analytics Application Program Interface (API).

11. The method of claim 7, wherein the data storage solution is generated from one or more desired data storage parameters for the data storage deployment.

12. The method of claim 7, wherein the method further comprises:
    generating a model data storage solution;
    validating the model data storage solution using a test suite; and
    in response to validating the model data storage solution, storing the validated data storage solution in the data storage repository.

13. A computer program product for calculating a deployment risk, the computer program product comprising a non-transitory computer readable storage medium having program instructions embodied therewith, the program instructions readable/executable by a processor to cause the processor to:
    query a deployed data storage solution for performance data, wherein the data storage solution provides data storage using hardware elements, software elements, an operating system, and drivers for the software elements;
receive the performance data from the deployed data storage solution;
store the performance data;
receive failure data;
calculate discrepancy data for the deployed data storage solution from the failure data;
store the discrepancy data;
generate a data storage solution that provides configurable data storage for an data storage deployment, wherein the data storage solution is organized as a data structure comprising a plurality of data storage components, and each data storage component comprises a hardware identifier for the hardware elements, and software prerequisites for the software elements, the operating system identifier, and a driver identifier for the software elements;
calculate a deployment risk for the data storage solution using a trade-off analytics function performed by a neural network and based on the discrepancy data, the performance data, a product match, an operating system match, and a software prerequisites match between the data storage solution and data storage parameters, wherein the neural network is trained on data storage solution field data comprising discrepancy data, performance data, and failure data for deployed data storage solutions; and in response to the deployment risk not exceeding a risk threshold, deploy the data storage solution by providing the hardware and software elements.

14. The computer program product of claim 13, the processor further managing discrepancies of the data storage solution.

15. The computer program product of claim 14, wherein the discrepancies comprise one or more of a product mismatch, an operating system mismatch, a prerequisite being unsatisfied, and an advanced feature being unsatisfied.

* * * * *